Dec. 16, 1958           H. A. RASS           2,864,264
CENTRIFUGALLY RESPONSIVE CAM OPERATOR
Filed Sept. 16, 1957           2 Sheets-Sheet 1
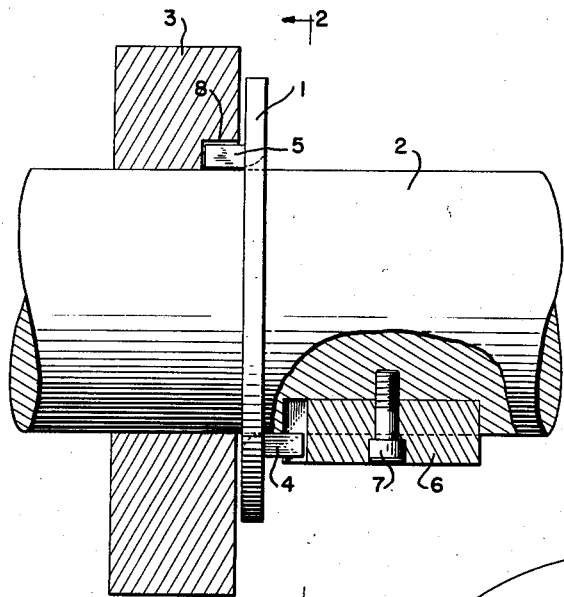
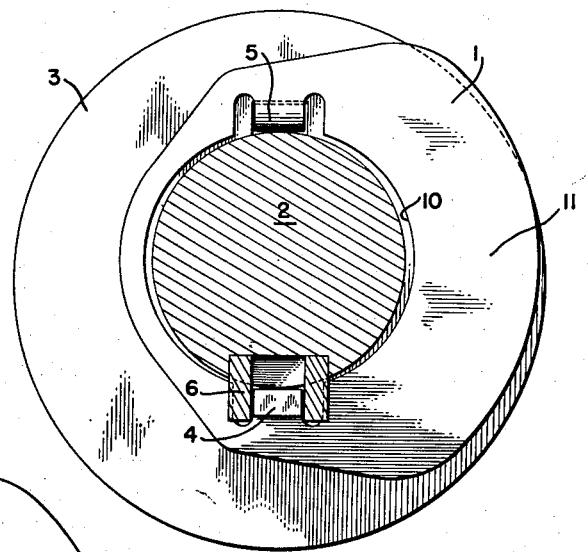
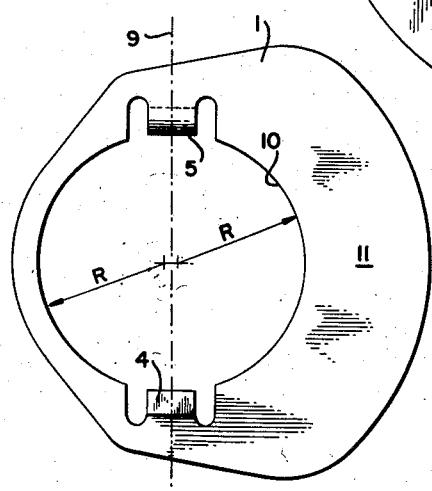
INVENTOR
HANS A. RASS
BY
ATTORNEY Dec. 16, 1958  H. A. RASS  2,864,264
CENTRIFUGALLY RESPONSIVE CAM OPERATOR
Filed Sept. 16, 1957  2 Sheets-Sheet 2

INVENTOR
HANS A. RASS
BY Paul L. Krohn
ATTORNEY

United States Patent Office 2,864,264
Patented Dec. 16, 1958

2,864,264

CENTRIFUGALLY RESPONSIVE CAM OPERATOR

Hans A. Rass, Rockford, Ill., assignor to Fairbanks, Morse & Co., Chicago, Ill., a corporation of Illinois Application September 16, 1957, Serial No. 684,122

9 Claims. (Cl. 74—568)

This invention relates generally to automatic timing control and more particularly to a centrifugally responsive operator for automatically varying the position of a timing cam relative to a drive shaft.

The primary object of this invention is to provide a simple, inexpensive operator for a timing cam which is fully automatic in adjusting the angular position of the cam on its drive shaft.

A specific object of this invention is to provide a simple automatic spark advance operator for magnetos.

A further object of this invention is to provide a one-piece sheet metal operator which connects a drive shaft to a driven cam in such a manner that centrifugal forces acting on the operator will automatically vary the angular position of the cam on the shaft.

With the foregoing and other objects in view the invention resides in the following specification and appended claims, certain embodiments and details of construction of which are illustrated in the accompanying drawings, in which:

Figure 1 is a partially sectioned view in side elevation of the cam operator comprising the invention as applied to a shaft and a cam driven thereby through the operator;

Figure 2 is a view in end elevation taken along the lines 2—2 of Figure 1;

Figure 3 is a view in end elevation of the cam operator comprising the invention;

Figure 4:
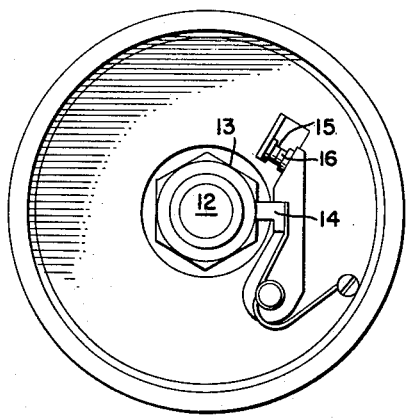
Figure 4 is a plan view of a portion of a magneto to which the operator of the invention may be applied.

Referring more particularly now to Figures 1, 2 and 3, it will be seen that a cam operator 1, formed from a one-piece sheet metal stamping, is provided to encircle a drive shaft 2 for a timing cam 3. The operator 1 is formed with right-angled, oppositely extending tabs 4 and 5 on either side of the body of the operator. In Figure 1 the shaft 2 is provided with a key slot member 6 which is secured to shaft 2 by a bolt 7. The cam 3 is provided with a recess 8 to accommodate, in keying relationship, tab 5 of operator 1.

As illustrated in Figures 2 and 3, the central opening 10 in operator 1 is not a perfect circle. Actually, the opening is somewhat oblong in nature. The opening is formed with each half or semi-circular portion thereof having equal radii R, with the center points thereof being offset equal distances to either side of a center line 9 through the tabs 4 and 5 of operator 1; the tabs 4 and 5 being substantially 180 degrees displaced from each other. Thus, the opening 10 will permit the operator 1 to rock angularly about shaft 2 about the point of engagement between the tab 4 and member 6 as a fulcrum. The cam 3 is snugly, but freely, mounted on shaft 2 for relative rotary movement thereto. Thus, when operator 1 is in driving connection between shaft 2 and cam 3, any rocking of the operator 1 will cause an angular shift of the cam 3 relative to the shaft. The operator 1 is so designed that one-half 11 thereof includes much more material than the other half, so that it will be inherently unbalanced and will be responsive to centrifugal forces during rotation to shift angularly on the drive shaft 2 carrying with it the timing cam 3.

Figure 5:
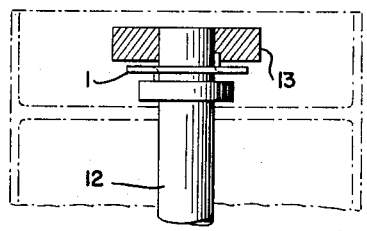
Figure 5 is a partially sectioned view of the operator comprising the invention, as applied to the magneto of Figure 4.

In Figures 4 and 5 the operator has been applied to a magneto breaker assembly wherein the spark will be automatically advanced as the shaft 12 comes up to speed by action of the operator 1 interposed between shaft 12 and cam 13. Cam 13 acts on the follower 14 to open the contacts 15 and 16. In breaker operation, the cam 13 (cam 3 of Figure 1) and hence the operator 1 is in an initial or full-retarded position angularly relative to the shaft 12 (shaft 2 of Figure 1) when the shaft is inactive or at rest. Such full-retarded position of the cam and operator is determined consequent to the frictional drag imposed on the cam by its operated means, as the breaker follower 14, which upon shaft deceleration to rest, causes deceleration retardation of the cam. Now, upon acceleration of shaft 12 toward and to running speed, the operator in response to centrifugal forces, will undergo angular shift about its fulcrum 6 (Figure 2) to angularly advance the cam relative to the shaft, and hence advance the timing of breaker operation. On the otherhand, upon shaft deceleration toward its at rest condition, the aforesaid drag influence on the cam will result in return of the cam and operator toward and ultimately to full-retarded position.

Figure 6:
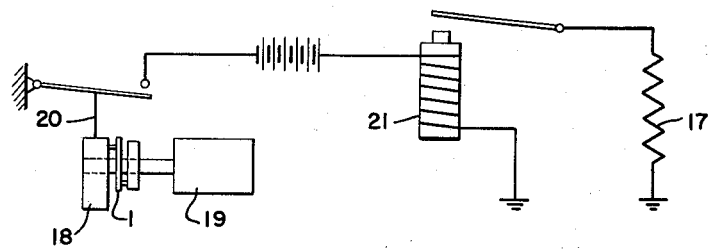
Figure 6 is a schematic view of a pulsing system in which the operator comprising the invention may be used.

In Figure 6 the operator 1 has been applied to an electrical pulsing system for a load 17. The cam 18, driven by a motor 19 through the operator 1, acts on a follower 20 to periodically close a circuit through relay 21. By varying the speed of motor 19 and thereby the centrifugal force acting on operator 1, the instant of energization of the relay circuit may be varied.

Figure 7:
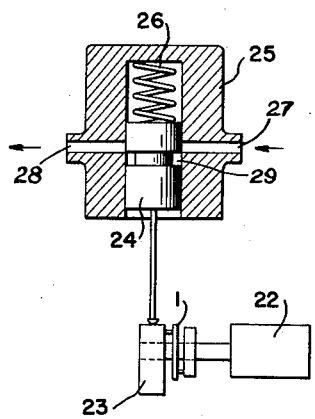
Figure 7 is a partially sectioned view of a fluid control valve, the operation of which is under the control of the operator comprising the invention.

In Figure 7 the operator 1 has been applied to a fluid control system valve. The motor 22 drives a cam 23 through the operator 1. Cam 23 acts periodically on a spool 24 in valve 25 against a spring 26 to open port 27 to port 28 through the reduced diameter portion 29 on spool 24. By varying the motor speed the action of the operator 1, responsive to centrifugal forces, may be varied to, in turn, vary the timing of the valve opening.

In the instances of operator application as shown by Figs. 6 and 7, the operator acts in similar manner to that described for the magneto breaker application of Figures 4 and 5. Thus, the operator responds to centrifugal forces on accelerations of the drive means, by angular shift in one direction away from its initial or normal retarded position of rest (drive means inactive). Upon deceleration of the drive means, the operator undergoes angular shift in the opposite direction responsively to the frictional drag imposed on the cam by the apparatus actuated thereby, as the pulsing switch 20 of Figure 6 and the valve 24 of Figure 7. When the drive means decelerates to stopped condition, the operator then will be in its initial or normal, full retarded position of rest, with the cam correspondingly angularly related to the drive shaft, as in its full retarded position.

It is thus seen that the invention provides a simple, centrifugally rseponsive cam operator which is suitable to various practical adaptations where automatically changeable timing is desirable.

What is claimed is:

1. An operator for a cam freely mounted on a shaft, comprising a single element of sheet material, said element including a pair of oppositely disposed one-hundred-and-eighty degrees displaced tabs projecting at right angles from the body of the element, one of said tabs engaging said cam in drive relationship and means on said shaft engaging the other of said tabs in drive relationship, said element being provided with an oblong opening surrounding the shaft and wherein the minor axis of the opening is along a center line transversely of the shaft through said pair of tabs and the major axis of the opening is normal to its minor axis, and the element having its center of mass off-set relative to the longitudinal axis of the shaft, the assembly being such that, upon rotation of the shaft, centrifugal force will rock the element about said means as a center on the shaft, to shift the cam angularly relative to the shaft.

2. An operator for a cam freely mounted on a shaft, comprising a single element of sheet material encircling the shaft with a loose fit, means connecting the element to the shaft at one point of the latter, means connecting the element to the cam at a point approximately one-hundred-and-eighty degrees from said point of shaft connection, and said element being inherently unbalanced relative to the shaft so as to respond to centrifugal forces to shift the cam angularly relative to the shaft.

3. An operator for a cam freely mounted on a shaft for relative rotary motion thereto, comprising a single element of sheet material encircling the shaft and capable of angular movements relative thereto, means keying the element to the shaft at one point for angular movement relative thereto, means keying the element to the cam at a point substantialy one-hundred-and-eighty degrees displaced from said shaft key point, and said element of sheet material having more weight to one side of a center line through the keying points than the other, whereby said element will respond to centrifugal forces to shift the cam angularly relative to the shaft.

4. An automatic timing control for a cam-operated magneto breaker mechanism with a rotary drive shaft, the control comprising a breaker operating cam mounted on the shaft for free relative rotary movement thereto, an operator for said cam comprising a single element of sheet material encircling the shaft and capable of angular movements relative thereto, means connecting the element and shaft at one point of the latter in a drive relationship, said element having means in drive engagement with the cam at a point substantially one-hundred-and-eighty degrees displaced from said means connecting said element and shaft, and said element being inherently unbalanced relative to the shaft so as to respond to centrifugal forces by angular movement on the shaft, to shift the cam angularly relative to the shaft to vary the timing of the breaker mechanism.

5. An automatic timing control for a magneto breaker mechanism with a rotary drive shaft, the breaker mechanism including a cam follower, said control comprising a cam mounted on the shaft for free relative rotary movement thereto and engaging said cam follower, and a single inherently unbalanced element angularly movable on the shaft and engaging the cam, means connecting the shaft and element, and said element responding to centrifugal force by angular movement on the shaft to shift the cam angularly relative to the shaft to vary the timing of the breaker mechanism.

6. An automatic timing control for a magneto breaker mechanism with a rotary drive shaft, the breaker mechanism including a cam follower, said control comprising a cam mounted on the shaft for free relative rotary movement thereto and engaging said cam follower, and an inherently unbalanced operator for said cam, said operator encircling the drive shaft with a loose fit thereon permitting angular movement of the operator relative to the shaft, said operator being provided with a pair of oppositely disposed, one-hundred-and-eighty degrees displaced tabs, means on the drive shaft engaging one of the tabs in drive relationship, the other tab engaging the cam in drive relationship, so that on rotation of the shaft the operator will respond to centrifugal forces due to its inherent unbalance, by angular movements on the shaft to shift the cam angularly relative to the shaft to vary the timing of the breaker mechanism.

7. An automatic control for an electrical pulsing circuit including a switch, comprising a cam for operating the switch, a drive shaft for said cam, the cam being mounted for free rotary movement on said shaft, a cam operator encircling the drive shaft and movable angularly relative to the shaft, said operator being provided with a pair of oppositely disposed, one-hundred-and-eighty degrees displaced tabs, means on the shaft in driving engagement with one of the tabs, the other tab engaging the cam in drive relationship, said operator being inherently unbalanced relative to the shaft so that on rotation of the shaft the operator will respond by angular movement on the shaft due to its inherent unbalance, to shift the cam angularly relative to the shaft to vary the timing of the switch in the pulsing circuit.

8. An automatic timing control for a fluid control system including a valve comprising a cam for operating the valve, a drive shaft for said cam, the cam being mounted for free rotary movement on said shaft, a one-piece cam operator encircling the drive shaft and movable angularly relative to the shaft, the center of mass of the operator being eccentric to the shaft whereby the operator is inherently unbalanced thereon, said operator being further provided with a pair of oppositely disposed, one-hundred-and-eighty degrees displaced tabs, means on the shaft in driving engagement with one of the tabs, the other tab engaging the cam in drive relationship so that on rotation of the shaft the operator will respond by angular movement on the shaft due to its inherent unbalance, to shift the cam angularly relative to the shaft to vary the timing of the valve operation in the fluid control system.

9. The combination with a drive shaft, a cam freely supported on the shaft, and means operated by the cam and imposing thereon a frictional drag force, of an operator for drivingly connecting the cam and drive shaft, comprising a one-piece element encircling the drive shaft and movable angularly relative thereto, said element providing an enlarged side portion such that the center of mass of the element is eccentric to the shaft, the element including diametrically opposite integral tabs one thereof in driving engagement with the cam, means on the shaft in driving engagement with the other tab of the element, said operator responding to centrifugal forces upon acceleration of the drive shaft, by angular shift thereof in one direction to advance the cam angularly relative to the shaft from a cam-retarded position, and being angularly shifted reversely upon drive shaft deceleration, by the cam then responsive to the said frictional drag force imposed thereon and shifting angularly relative to the shaft toward said retarded position of the cam.

References Cited in the file of this patent

UNITED STATES PATENTS

| | | |
|---|---|---|
| 465,014 | Brazelle | Dec. 15, 1891 |
| 1,074,879 | London | Oct. 7, 1913 |
| 1,076,472 | Wilkinson | Oct. 21, 1913 |
| 1,549,669 | Kindl | Aug. 11, 1925 |
| 1,825,720 | Fitzsimmons | Oct. 6, 1931 |
| 2,388,994 | Phelon | Nov. 13, 1945 |